United States Patent Office 3,504,396
Patented Apr. 7, 1970

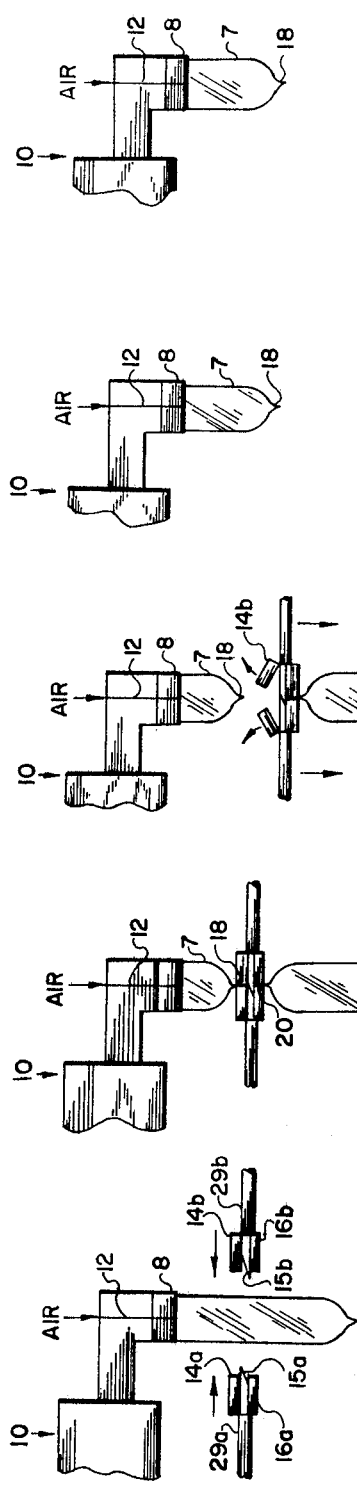

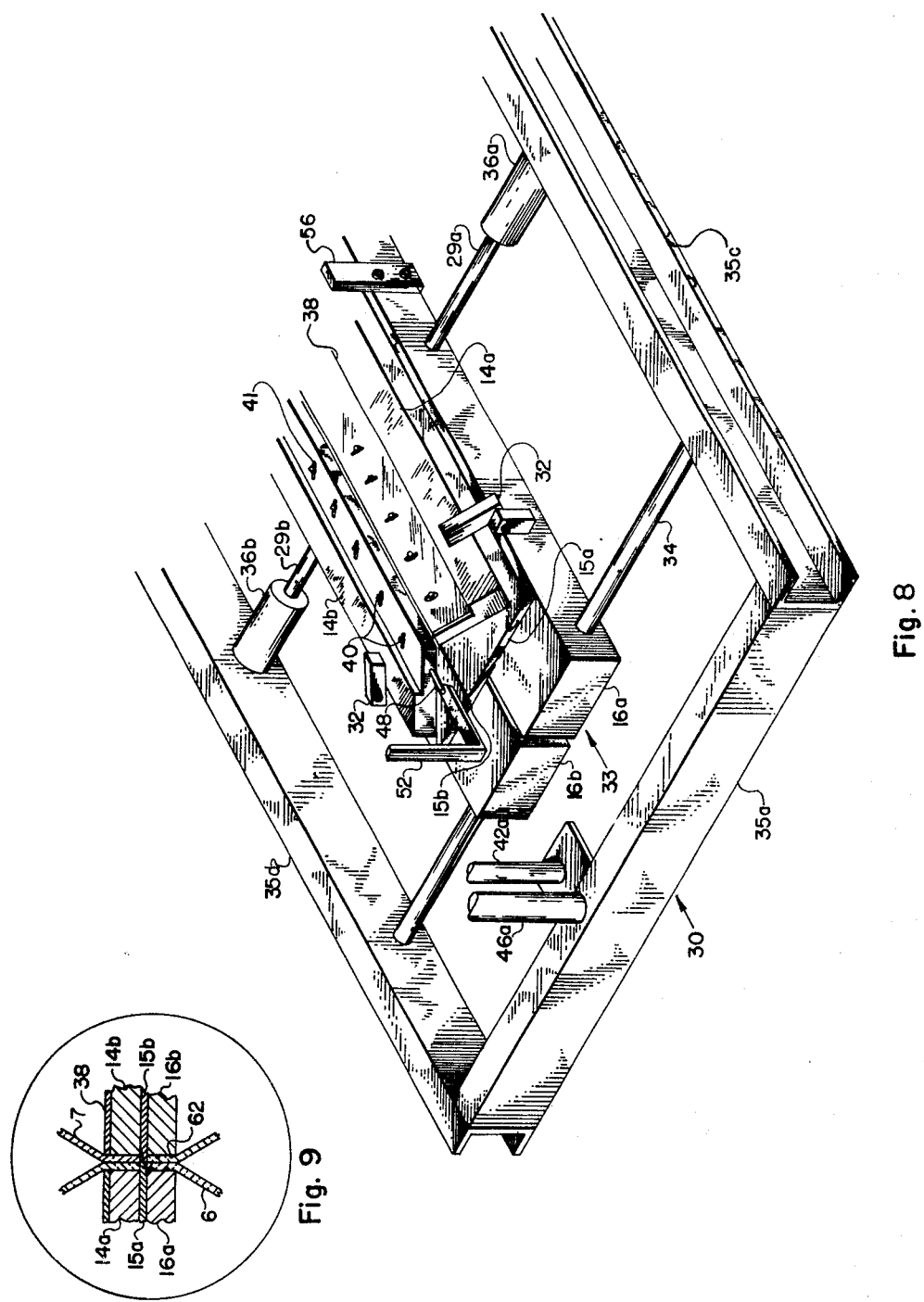

3,504,396
APPARATUS FOR FORMING HOLLOW ARTICLES
Calvin L. Button and Waldemar E. Woods, Cedar Rapids, Iowa, assignors to W. R. Grace & Co., Duncan, S.C., a corporation of Connecticut
Filed July 8, 1966, Ser. No. 563,752
Int. Cl. B29c *17/07;* B29d *23/03*
U.S. Cl. 18—5                                                           3 Claims

ABSTRACT OF THE DISCLOSURE

Apparatus for preparing a parison for blow molding and transferring the parison to the blow molding means including an assembly having a pair of opposed releasing sealing members and a pair of opposed gripping sealing members with a separating means between them and a means for moving the entire assembly to transfer the sealed tubular section to a blow molding means.

---

This invention relates to apparatus for forming a hollow article from an organic thermoplastic material. In one aspect the invention relates to blow molding. In another aspect the invention relates to forming and transferring a parison to a molding zone.

It is well known to form hollow articles from thermoplastic materials by downwardly extruding a molten tubing through an annular extrusion orifice or die to form an extended tubing or parison and then introducing the parison into a blow molding device where air is injected into the tube to expand it against the respective faces of the two mold halves. The shaped article is then cooled and removed from the mold. Because the blow molding operation is discontinuous (that is, a period of time is required to close the mold, form the article, cool and remove it) and the extrusion operation is basically continuous, a number of methods and devices have been proposed for converting the operation into a semicontinuous operation. For example, a plurality of nozzles or dies can be used in series so that while one parison is being formed from one die the parison previously formed from another die is being blown. It has also been proposed to employ an "accumulator" with the extruder so as to convert the extrusion operation into a discontinuous operation; that is, after a parison has been formed, flow from the die is curtailed and the thermoplastic material is accumulated or stored within the extruder until the blow molding operation is ready for another parison.

A more direct approach has been to slidably mount the blow molding device to permit it to reciprocate into and out of position to receive parison. Thus, the mold will close onto a parison, tear it from the extruder die and slide back to complete the blow molding and cooling cycle while another parison is being formed.

More recently, it has been proposed to employ devices referred to as parison transfer units. Basically, this entails lowering the blow molding zone at least one parison length so that a full length parison may be extruded above the molding zone; the upper end of the parison is then pinched off or grasped and torn from the extrudate and bodily conveyed downwardly to the molding zone. Then while an article is being molded from this first parison, the parison transfer unit returns in preparation for removing the next parison which is being formed.

Heretofore proposed parison transfer units have had several difficulties in connection with conveying this molten mass of thermoplastic material into a confined molding zone. For example, the interior walls of the tubing or parison may contact each other while hanging-free from the die and fuse together thus preventing subsequent molding. Also certain mold designs require maximum accuracy in inserting the parison between the mold halves to prevent permature contact of the exterior parison wall and the mold faces as well as preventing the interior walls of the parison from fusing together. In addition, tearing of the depending parison from the extruder die creates problems that may cause defects in the final product. For example, when the parison is torn from the die there is a tendency for the extrudate to "hang-up" or adhere to the die thus causing folds in the lower half of the succeeding parison.

The invention is equally applicable to any type of blow molding including vacuum or vacuum assist molding. For simplicity the discussion of the actual molding operation will be limited since blow molding techniques are well known in the art and the selection of temperatures, air pressures, types of cooling, methods and apparatus for closing the mold halves and injecting air into the parison are well known. The formation of double walled hollow articles having two halves integrally connected with a compression molded hinge is described in more detail in the copending U.S. patent application, S.N. 441,811, filed Mar. 22, 1965 by Peter T. Schurman et al., assigned to the same assignee as the present invention. In this particular type of molding, the parison is inserted between the mold halves which are then closed, and air is injected into the parison in the upper and lower portions to inflate the parison and force it against the mold faces. The mold faces are designed with a protuberance to cause compression molding of an integral hinge in an intermediate portion of the parison thus fusing the walls of the parison together. The article is then cooled, the mold halves separated and the article removed.

It is an object of the invention to provide apparatus for blow molding hollow articles.

Another object is to provide apparatus for transporting a hollow parison. Yet another object is to provide apparatus for positioning a hollow parison of molten thermoplastic material into a blow molding zone.

Still another object of the invention is to provide apparatus for extruding a molten parison of thermoplastic material, transporting the parison to a blow molding zone and blow molding a hollow article.

These and other objects of the invention will be readily apparent to those skilled in the art from the following disclosure, claims and appended drawing.

It has now been found that the aforementioned difficulties can be overcome by injecting air into the extruded tubular parison, sealing off the upper and lower portions of the parison to form a sealed parison section, separating the sealed section from the still forming succeeding parison and transferring the sealed parison to the blow molding zone.

The apparatus for accomplishing these objectives comprise means for sealing both the upper and lower portions of the extruded parison, means for separating the thus sealed parison from the succeeding parison and means for transporting the sealed parison to the blow molding device.

For a detailed explanation of the invention reference is made to the accompanying drawing in which FIGURE 1 is a perspective view of a typical extruder, parison transfer unit and a typical blow molding device.

FIGURES 2, 3, 4, 5 and 6 show diagrammatically a side view of a sequence of steps in the extrusion and formation of a parison, the transference of a sealed parison section to a blow molding device and the return of the parison transfer unit to the following parison while the previous parison is being blow molded.

FIGURE 8 is a perspective view showing a portion of the parison sealing members and severing devices.

FIGURE 9 is an enlarged view of a section showing the parison at the point of sealing and severing.

Figure 1:
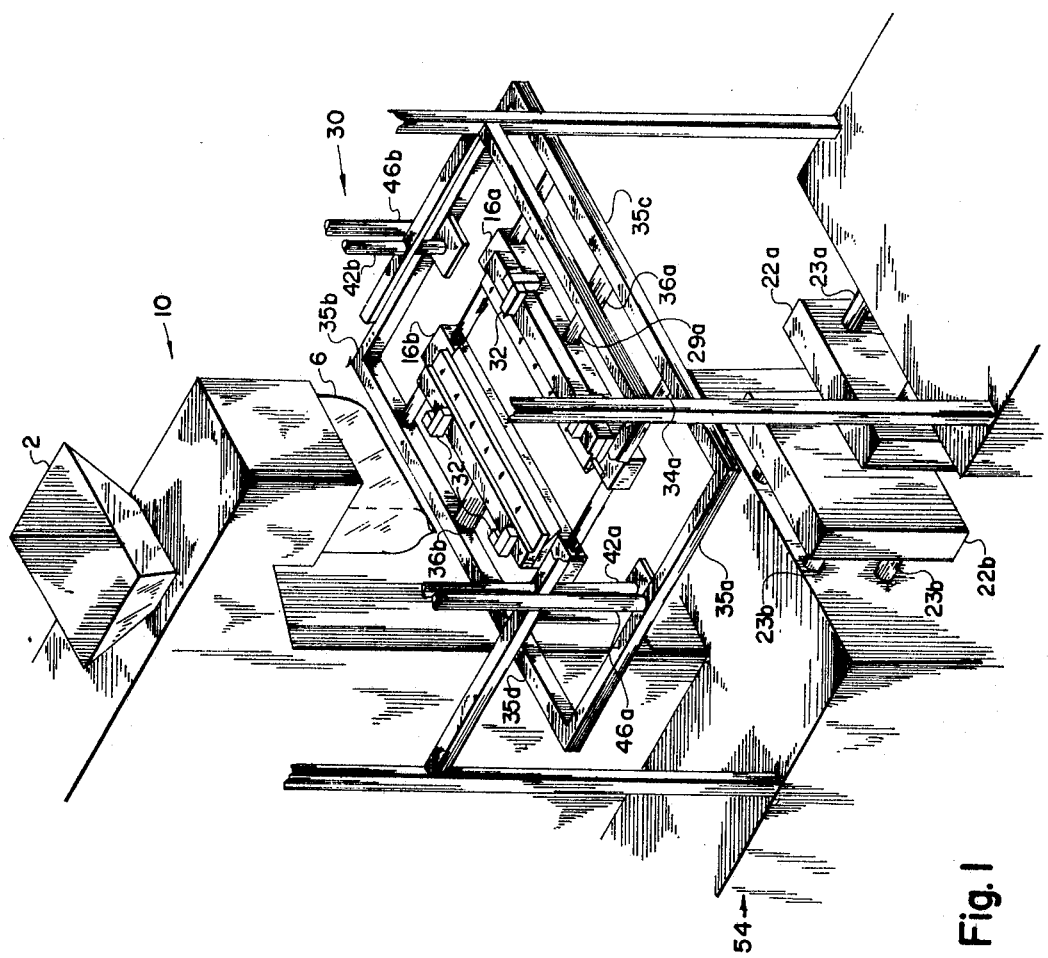

As shown in FIGURE 1 an integrated assembly for the formation of hollow articles from thermoplastic material, such as high density polyethylene, comprises 3 units operatively connected in series: (1) an extruder 10 equipped with an annular die capable of extruding a tube of molded plastic downwardly, (2) a parison transfer unit 4, and (3) a blow molding device 54. The particles of polymer as well as additives such as pigments, plasticizers, and the like are introduced into a conventional extruder 10 through a hopper 2. Extruders for such purpose are well known in the art and the selection of the temperatures, pressures, screw designs, and dies are well within the skill of the art so that further discussion of these features is unnecessary. The polymeric particles are thoroughly melted and blended within the extruder and are then extruded downwardly to form an open ended more or less circular or elliptical tubing 6 which becomes extended as more polymer is extruded. The interior walls of the molten tubing may contact each other and thus prematurely fuse together. This is especially possible when the annular die is a shape other than circular, for example, if the die is elliptical the walls are relatively close together and thus more subject to fusion. As described herein the parison will be generally elliptical although it is understood that other shapes can be extruded, sealed and conveyed by the method and apparatus of this invention. When a parison of desired length has been extruded, the parison transfer unit 4, to be described in more detail later, transversely pinches off the parison 6 a few inches below the die and severs the thus sealed tube from the depending extrudate. The bottom of the parison has previously been sealed by a similar action. Air has been injected into the parison through a pipe or conduit through a die. The parison transfer unit then moves the sealed tubing section downwardly and inserts it between the mold halves.

FIGURES 2, 3, 4, 5 and 6 illustrate diagrammatically a series of steps for the production of articles by the method and apparatus of the invention. The basic operative portion of the parison transfer unit representing a preferred embodiment of the invention comprises a sealing and severing assembly 33 comprising 3 parts; a pair of coacting upper sealing members 14a, 14b, a pair of coacting lower sealing members 16a, 16b and a pair of coacting severing members 15a, 15b intermediate the upper and lower sealing members. The right and left hand portions of the assembly are horizontally and vertically reciprocal as will be described in more detail later.

With reference to FIGURES 2-6, inclusive, only the fundamental elements are shown so as to clarify the sequence of steps. As shown in FIGURE 2 the molten polymer is extruded downwardly through a die 8 from an extruder 10 to form a molten tubing or parison 6 having an elliptical shape. Air or other fluid is injected through a conduit 12 passing through die 8 to inject air into the interior of the tubing so as to prevent contact of the interior walls. The individual pairs of the sealing bars and severing means are positioned on each side of the extruded parison and are movable horizontally so as to effect simultaneous sealing and severing of the molten parison as shown in FIGURE 3. The bottom seal of the parison is formed by the upper sealing bars in the previous operation. The pressure of the upper sealing bars on either side of the parison forms an upper seal 18 on the lower portion of the succeeding parison 7 while the pressure of the lower sealing members fuses the upper portion of the lower parison 6 to form a seal 20. Simultaneously with these two sealing actions, the severing means 15a, 15b cuts the parison between seals 18 and 20 so as to separate the lower sealed parison section 6 from the still forming upper parison 7. This lower parison is thus sealed on both ends, since the lower end seal 19 was formed by the previous operation, so as to trap air therein to form a sort of pillow to prevent contact of the walls. In the meantime the blow molded article 60 formed from the previous parison is being removed from the mold halves 22a, 22b.

As shown in FIGURE 4 the upper sealing members 14 are pivotally connected so as to assist severance of the upper parison and release of seal 18 so that the parison transfer assembly 33 can descend. Any suitable means for releasing the upper parison may be employed, for example, the upper sealing members may be slidably connected. The descent of the parison transfer assembly 33 occurs almost simultaneously with the closing of the sealing bars so that the succeeding parison will not be even momentarily "resting" on the top of the sealing bars thus preventing unequal wall thicknesses.

As shown in FIGURE 5 the parison transfer assembly 33 then conveys the sealed tubing section 6 downwardly and positions it between mold halves 22a, 22b. Meanwhile, the extruder continues to form a depending molten tubing 7 with a sealed lower portion 18. After insertion of the sealed parison 6 between the mold halves, the mold halves close together horizontally on rods 23a, 23b and are so designed as to completely seal the parison thus trapping the air inside the tubing. Immediately after the mold halves have closed upon the sealed parison section, the parison transfer assembly diverges outwardly and upwardly, as shown in FIGURE 6, thus releasing the parison and returning to the upper extremity of its stroke to a position suitable to permit engagement of the succeeding parison 7 after it has completely developed. After the mold halves have closed upon the parison, air is injected through a conduit 25 into the sealed parison by any suitable means; for example, a needle-like tubing (not shown) in a wall of the mold face is caused to penetrate the wall of the parison 6 and air is then injected through the tubing to force the parison walls into intimate contact with the mold faces. The tubing is then withdrawn into the mold prior to removal of the article. The presence of air in the sealed parison assists the blow molding by holding the walls apart while the mold halves are being closed to prevent bridging. Also the air provides resistance thus making it easier for the air inlet needle to puncture the wall of the parison and reduces the amount of air that must be injected. The molded articles must be cooled sufficiently to permit them to retain their shape after removal from the mold. This may be accomplished simultaneously with or subsequent to the blowing step and by any suitable method such as passing cooling water through conduits in the body of the mold adjacent the mold faces (not shown). After the desired level of cooling has been achieved, the mold halves are opened and the molded article 60 is removed from the mold.

As shown in FIGURE 6 the parison transfer assembly 33 then moves vertically into position to engage the upper portion of the succeeding parison 7 and then moves horizontally inwardly (FIG. 2) to seal off the parison 7 and the operation is repeated.

The positioning of the parison transfer unit 4 relative to the extruder 10 and blow molding device 54 and the support of the elements by suitable framework are well within the skill of the art. For example, the blow molding device could be positioned other than directly under the extruder die so that the parison transfer unit would transfer the parison laterally instead of, or in addition to, moving it downwardly.

Figure 7:
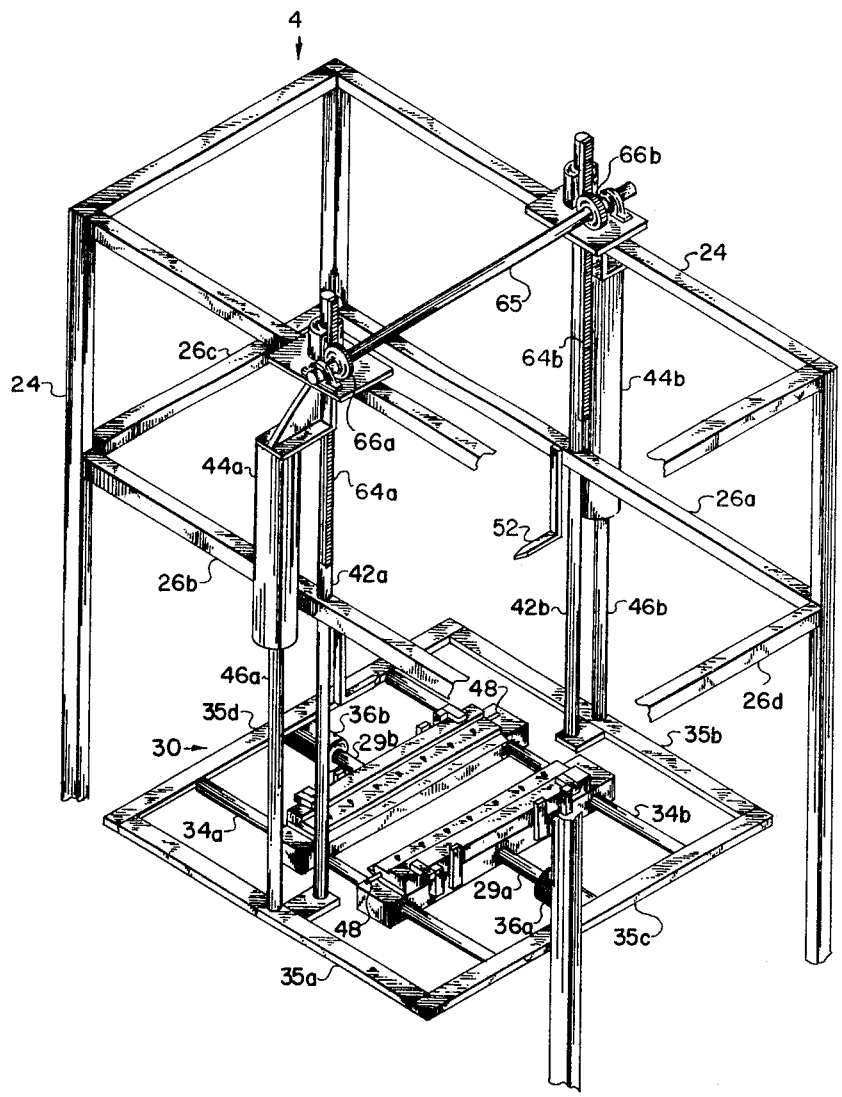
FIGURE 7 is a perspective view of a parison transfer unit.

A simplified illustration of an operable transfer unit embodying the invention herein is illustrated in FIGURE 7. A suitable frame comprising vertical and horizontal frame members 24 and cross members 26a, 26b, 26c, 26d wherein cross members 26a, 26b support a floating platform support assembly 30 of horizontally disposed frame members 31a, 31b, 31c, 31d. This floating platform 30 includes the sealing and severing assembly 33 and suitable mechanism for effecting the reciprocal horizontal and vertical movement of the assembly 33. A pair of coacting upper pivotal sealing pressure bar members 14a, 14b are cooperatively associated with a pair of coacting lower sealing pressure bar members 16a, 16b. Knives 15a, 15b, or hot wire or opposing projections or other type of severing means, is positioned between each pair of upper and lower sealing members so that when the sealing bars come together the intermediate molten plastic is severed. A mechanism for severing may be omitted whereby upper sealing bars may be moved laterally after sealing causing separation of the two parisons by tearing or the upper sealing bars may be pivoted upwardly with tear action in that direction. The upper sealing bar members are suitably pivoted by means of hinges 32. The assemblies are slidably mounted on a pair of rods 34a, 34b. Each assembly is horizontally reciprocal on these rods and is driven in and out by any suitable means such as air cylinders 36a, 36b connected to each assembly of sealing bars by piston rods 29a, 29b. To insure engagement of the upper sealing bars with the parison means may be provided to permit adjustment of the distance between the coacting bars; for example, a plate 38 may be suitably attached to the upper sealing member by screws 40 in elongated slots 41. The floating platform assembly 30 is vertically reciprocal by any suitable means, for example, support members 35a, 35b of the platform is slidably mounted on vertical rods 42a, 42b. Vertical movement is provided by hydraulic cylinders 44a, 44b connected to frames 35a, 35b by piston rods 46a, 46b. Means may be provided to coordinate vertical movement of the platform on rods 42a, 42b such as racks 64a, 64b and gears 66a, 66b and rod 65 cooperating with the upper end of rods 42a, 42b.

Any suitable means may be employed to cause the upper sealing members 14a, 14b to release the sealed upper parison. For example, a pin 48 is positioned on at least one end of each upper sealing member. A device such as tripping member 52 is suitably mounted on the frame, so as to miss contact with the pin 48 when the assemblies are separated on the ascending portion of the cycle. The horizontally extending portion of the tripping member 52 is positioned so as to be below the pin when the sealing bars are closed so that as the floating support assembly 30 moves downwardly it will cause the upper sealing members to pivot and thus release the upper succeeding parison. The arc of the pivot can be increased or decreased by mounting said pin rearwardly or forwardly, respectively. As soon as the upper parison has been released and the pin is below the plane of the horizontal portion of the tripping member 52, gravity will force the upper sealing members 14a, 14b down into their normal position. Stop means 56 or the like may be provided to prevent the bars 14a, 14b from pivoting to far. The surfaces of the sealing bars 16a, 16b may be roughened or the like to assist the grasping or holding of the parison.

FIGURE 8 is an enlarged view of a portion of the parison transfer assemblies showing the upper sealing bars in an open position as hereinbefore described.

FIGURE 9 is an enlarged view of a section of the parison being held between the sealing bars at the moment of contact and also showing that the severing has occurred. Knobs or projections 62 may be used to assist in grasping the parison to prevent slippage.

Although the sealing bars have been illustrated with flat faces, other shapes may be employed; for example, the bars could be rounded which would tend to reduce waste and speed release of the sealed parison.

The invention is not limited to any particular type polymer. Any thermoplastic material suitable for blow molding may be employed. A suitable material is high density polyethylene although other polymers such as polypropylene, polystyrene, polyamides, and the like are well known to the blow molding art and are employable with the method and apparatus of this invention. The term polymer, as used herein includes homopolymers, random and block copolymers, graft copolymer, laminates and the like.

Any fluid, preferably a gas such as air, may be used to form the sealed parison section. The pressure of the air is sufficient to prevent the walls of the parison from sticking together and is generally slightly above the ambient atmospheric pressure, for example, less than 5 p.s.i.g., more preferably 0.1–2 p.s.i.g. The air need not be preheated but is generally preheated by its passage through the extruder die.

It will be readily understood by one skilled in the art that motivating means, motors, switches, and the like will be employed to automatically operate the device of this invention.

While certain examples, structures, composition and process steps have been described for purposes of illustration, the invention is not limited to these. Variation and modification within the scope of the disclosure and the claims can readily be effected by those skilled in the art.

We claim:

1. Apparatus for preparing a parison for blow molding means comprising
    (a) extrusion means for downwardly extruding a plastic tube of a plastic material through a die,
    (b) an assembly for gripping and forming a first seal area across the tubing and supporting the tubing, forming a second seal area across the tubing above the first seal area, separating the tubing between the two seal areas and forming an independent sealed tubular section on each cycle of operation after the first cycle of operation, and transferring the independent tubular section supported by the assembly to blow molding means through movement of the entire assembly, said assembly having,
        (1) a pair of horizontally reciprocal gripping sealing bars positioned on either side of said tube and sealing the extruded hollow plastic tube by pressing the sides of the tube together and maintaining said grip and supporting the sealed tubular section until the sealed tubular section has been transferred to the blow molding means,
        (2) a pair of horizontally reciprocal releasing sealing bars positioned on either side of said tube and sealing the tubing by pressing the sides of the tube together above the gripping sealing means adjacent the die, said bars being pivotally mounted and pivoting to become unengaged from said tubing when the sealed tubular section is being transferred to the blow molding means by the assembly without damaging the tubing above the separation,
        (3) separating means for separating the tubing between the two seals to complete the formation of an independent sealed tubular section supported by the assemblies gripping sealing means,
    (c) and means for moving the entire assembly to transfer the sealed tubular section to a blow molding means wherein a shaped article is formed.

2. Apparatus for preparing a parison for blow molding means comprising
    (a) extrusion means for downwardly extruding a plastic tube of a plastic material through a die,
    (b) an assembly for gripping and forming a first seal area across the tubing and supporting the tubing, forming a second seal area across the tubing above the first seal area, separating the tubing between the two seal areas and forming an independent sealed tubular section on each cycle of operation after the first cycle of operation, and transferring the independent tubular section supported by the assembly to blow molding means through movement of the entire assembly, said assembly having, (1) a gripping sealing means sealing the extruded hollow plastic tube and maintaining said grip and supporting the sealed tubular section until the sealed tubular section has been transferred to the blow molding means, (2) a releasing sealing means for sealing the tubing above the gripping sealing means adjacent the die and being unengaged from said tubing when the sealed tubular section is being transferred to the blow molding means by the assembly, (3) severing means between sealing means (1) and (2) for separating the tubing between the two seals to complete the formation of an independent sealed tubular section supported by the assemblies gripping sealing means, (c) a horizontal reciprocating driving means simultaneously positions means (1) and (2) and severing means (3) into contact with the downwardly depending tube and retracts only means (1) from the downwardly depending tube, other means releasing means (2) and (3) from active contact with the downwardly depending tube, (d) and means for moving the entire assembly to transfer the sealed tubular section to a blow molding means wherein a shaped article is formed.

3. Apparatus for preparing a parison for blow molding means comprising (a) extrusion means for downwardly extruding a plastic tube of a plastic material through a die, (b) an assembly for gripping and forming a first seal area across the tubing and supporting the tubing, forming a second seal area across the tubing above the first seal area, separating the tubing between the two seal areas and forming an independent sealed tubular section on each cycle of operation after the first cycle of operation, and transferring the independent tubular section supported by the assembly to blow molding means through movement of the entire assembly, said assembly having (1) a pair of opposed (and reciprocal) gripping sealing members, said gripping sealing members positioned on opposite sides of the extruded hollow plastic tube, at least one of said gripping sealing members being reciprocal toward the other of said gripping sealing members to grip and seal said tube by inward reciprocation pressing the sides of the tube together and maintaining said grip and supporting the sealed tubular section until the sealed tubular section has been transferred to the blow molding means, (2) a pair of opposed releasing sealing members, said releasing sealing members positioned on opposite sides of the extruded hollow plastic tube and above the gripping sealing members adjacent the die, at least one of said releasing sealing members being reciprocal toward the other of said releasing sealing members and moving independently of b(1) to release said tubing for transfer of the sealed tubular section to the blow molding means by the assembly without damaging the tubing, (3) separating means for separating the tubing between the two seals to complete the formation of an independent sealed tubular section supported by the assembly's gripping sealing members and (c) means for moving the entire assembly to transfer the sealed tubular section to a blow molding means wherein a shaped article is formed.

References Cited

UNITED STATES PATENTS

| 2,541,249 | 2/1951 | Hobson | 264—98 |
| 2,783,503 | 3/1957 | Sherman. | |
| 3,204,018 | 8/1965 | Hagen | 264—99 |
| 3,294,885 | 12/1966 | Cines et al. | 264—99 |

FOREIGN PATENTS

| 1,438,403 | 4/1966 | France. |
| 1,163,000 | 2/1964 | Germany. |

ROBERT F. WHITE, Primary Examiner

T. J. CARVIS, Assistant Examiner

U.S. Cl. X.R.

264—99

UNITED STATES PATENT OFFICE
CERTIFICATE OF CORRECTION

Patent No. 3,504,396                          April 7, 1970

Calvin L. Button et al.

It is certified that error appears in the above identified patent and that said Letters Patent are hereby corrected as shown below:

Column 2, line 2, "permature" should read -- premature --. Column 5, line 53, "to" should read -- too --. Column 7, line 40, cancel "(and reciprocal)".

Signed and sealed this 25th day of August 1970.

(SEAL)
Attest:

Edward M. Fletcher, Jr.
Attesting Officer

WILLIAM E. SCHUYLER, JR.
                                      Commissioner of Patents